United States Patent [19]
Cormier

[11] Patent Number: 6,093,316
[45] Date of Patent: Jul. 25, 2000

[54] SEWAGE TREATMENT APPARATUS

[76] Inventor: Murphy Cormier, 2885 Hwy. 14 East, Lake Charles, La. 70607

[21] Appl. No.: 09/095,854

[22] Filed: Jun. 11, 1998

Related U.S. Application Data

[63] Continuation-in-part of application No. 08/541,507, Oct. 10, 1995, Pat. No. 5,874,002.

[51] Int. Cl.[7] .................................................... C02F 3/20
[52] U.S. Cl. ........................ 210/195.4; 210/199; 210/207; 210/220; 210/221.2; 210/256
[58] Field of Search .................................... 210/626, 629, 210/195.3, 195.4, 202, 205, 220, 221.2, 256, 532.2, 199, 207

[56] References Cited

U.S. PATENT DOCUMENTS

| | | | |
|---|---|---|---|
| 2,987,186 | 6/1961 | Burgoon et al. | 210/197 |
| 3,195,727 | 7/1965 | Kibbee | 210/195 |
| 3,206,032 | 9/1965 | Nottingham et al. | 210/195 |
| 3,805,957 | 4/1974 | Oldham | 210/98 |
| 3,951,817 | 4/1976 | Snyder | 210/220 |
| 4,859,325 | 8/1989 | Cormier | 210/516 |
| 5,162,083 | 11/1992 | Forbes et al. | 210/199 |
| 5,196,114 | 3/1993 | Burwell | 210/188 |
| 5,221,470 | 6/1993 | McKinney | 210/151 |
| 5,490,935 | 2/1996 | Guy | 210/620 |
| 5,549,818 | 8/1996 | McGrew | 210/195.4 |
| 5,714,061 | 2/1998 | Guy et al. | 210/195.3 |

*Primary Examiner*—Peter A. Hruskoci
*Attorney, Agent, or Firm*—Ostrolenk, Faber, Gerb & Soffen, L.L.P.

[57] ABSTRACT

A sewage treatment apparatus including a treatment tank with a floor and walls and having an upper aperture. A hopper having a clarifier chamber with upper and lower apertures is centrally disposed on hopper supports in the treatment tank, maintained at a predetermined height. A deflector cone is centrally disposed on the tank floor with its vertex received in the lower aperture of the hopper. The exterior of the hopper, the deflector cone and the interior walls of the treatment tank define an aerator chamber, subdivided into a plurality of aerator zones. Diffusers in each aerator zone introduce air into the aerator zones, inducing sewage to flow in a generally vertical orientation in the treatment tank. A cover mounted over the treatment tank aperture maintains a pressurized pocket of air above the sewage for increased oxygenation of the sewage. Treated sewage passes from the aerator zones into the clarifier chamber, then into the environment. Another embodiment of the invention includes a trash trap in fluid communication with the inlet for filtering the sewage prior to treatment. A settling tank in fluid communication with the outlet is provided for filtering the sewage prior to its voidance. A method for sewage treatment is also provided.

8 Claims, 3 Drawing Sheets

SEWAGE TREATMENT APPARATUS

REFERENCE TO EARLIER APPLICATION

This application is a continuation-in-part of U.S. patent application Ser. 08/541,507, filed Oct. 10, 1995, by Murphy Cormier, issued as U.S. Pat. No. 5,874,002, on Feb. 23, 1999, entitled *Sewage Treatment Method and Apparatus Therefor*.

BACKGROUND OF THE INVENTION

1. Field of the Invention

The invention relates to a sewage treatment plant including clarifier and aerator chambers which promote sewage-degrading flow characteristics.

2. Description of the Related Art

Self-contained subterraneous sewage treatment apparatuses commonly are used in communities in which houses are not connected to centralized sewage systems. Typically, these apparatuses are constructed from concrete or fiberglass, cast as one part or formed from a number of parts. The apparatuses usually include a housing with walls that define internal aerator and clarifier chambers. The aerator chamber is the heart of the sewage treatment plant. Sewage received in the aerator chamber is oxygenated. Introduction of oxygen into the sewage intimately mixes the organic components of the sewage with the bacteria populations in the aerator chamber, creating an activated sludge. The bacteria reduce the organic components of the sewage. Additionally, to maximize the oxygen content of the sewage, the sewage must circulate in a manner that maintains organic components in suspension. If the organic components settle, they are not as accessible and less likely to be broken down by the bacteria.

Ideally, once the sewage is has been treated sufficiently, when the bacteria has broken down a target amount of the organic components in solution, the activated sludge passes from the aerator chamber into a clarifier chamber. In the clarifier chamber, any solids remaining in suspension which have not been broken down settle and are returned to the aerator chamber for continued circulation and breakdown. The activated sludge is treated in the clarifier chamber then voided out of the clarifier chamber to be absorbed by the environment.

The key to consistent, efficient, and reliable sewage treatment is assuring that the proper amount of oxygen is introduced into the sewage for reaction with the bacteria. The speed at which reduction of the organic components in the sewage is accomplished is directly related to the amount of oxygen that can be introduced into the sewage. The rate of oxygen introduction is directly related to the configuration of, and the diffusion mechanisms used to introduce oxygen in the aerator chamber. Proper configuration of the aerator chamber and placement of the diffusers therein is crucial. Once an appropriate configuration is selected, oxygen content enhancement of the sewage may be increased by increasing the flow of the sewage within the chamber, perhaps with turbulent characteristics. The oxygen content also may be enhanced by maintaining oxygen at a high pressure in association with the sewage, similar to carbonating a beverage.

The patent literature is replete with many sewage treatment apparatuses; however, none provide for enhancing sewage flow, nor associating gas at super-ambient pressure with sewage. For example, U.S. Pat. No. 2,987,186, issued Jun. 6, 1961, to David W. Burgoon et al., describes an apparatus for treating waste materials. The apparatus includes a tank with a vertical wall that defines side-by-side aerating and clarifying chambers. A diffuser is centrally located in the aerating chamber. Activated sludge from the aerating chamber passes into the clarifying chamber via an aperture in a vertical wall. Particulate matter remaining in solution precipitates from solution and flows back into the aerating chamber via a conduit at the bottom of the vertical wall. The conduit has an outlet proximate to the diffuser. The clarified sewage passes out of the clarifying chamber by an exit conduit and into the environment.

U.S. Pat. No. 3,195,727, issued Jul. 20, 1965, to Gary W. Kibbee, describes a waste products treatment apparatus having floating solid feedback structure. The device has laterally-disposed aerating and clarifying chambers. The clarifier chamber does not extend all the way to the bottom of the tank. An angled wall between the aerator chamber and the clarifier chamber projects into the outer wall of the clarifying chamber, above the bottom of the tank. A passageway between the angled wall and the outer wall permits particulate matter in suspension to return to the aerating chamber. The clarifier chamber also includes a baffle for trapping large particulate matter. On the other side of the baffle is a clarified liquid basin. Clarified sludge is voided from the clarified liquid basin into the environment.

U.S. Pat. No. 3,206,032, issued Sep. 14, 1965, to Mark C. Nottingham et al., describes a sewage disposal tank. The apparatus includes a tank, defining three serial chambers. The first chamber includes a number of diffusers which introduce oxygen into and circulate the sludge. Oxygenated sludge from the first chamber passes into the second chamber after having passed through a baffle that filters out large particulate matter. The second chamber includes a centrally- and bottomly-disposed foraminous member for screening sewage introduced into the second chamber. Some of the screened sewage is returned to a pump and urged through the diffusers along with ambient air. The second chamber is in fluid communication with the third chamber via a weir located near the surface of the sewage. Lighter, clarified sewage is conducted into the third chamber, a holding chamber. The sewage from the third chamber is voided into the environment.

U.S. Pat. No. 3,805,957, issued Apr. 23, 1974, to Robert R. Oldham et al., describes a floating solids return device. The device includes a tank having three serial chambers. Sewage is introduced into the first chamber and allowed to settle. Sewage flows into the secondary chamber through a weir located near the surface of the sewage. The second chamber includes a diffuser which introduces air into the sewage. Sewage flows from the second chamber into the third chamber through another weir located proximate to the sewage surface. The third chamber has an angled outer wall and a vertical wall separating the third chamber from the second chamber. The angled and vertical walls intersect above the bottom of the second chamber. The vertical wall has a passageway between the second and third chambers permitting solid particulate matter to be returned into the second chamber. Treated sewage is voided from the third chamber via another weir.

U.S. Pat. No. 3,951,817, issued Apr. 20, 1976, to John R. Snyder, describes a sewage treatment tank and tube settler. The device includes a diffuser located in the middle of and near the sewage surface of an aerating chamber. Material from the aerating chamber passes through a lower passage between the aerating chamber and a clarifying chamber, rather than through the weir located at the surface. The device also includes a weir located at the surface between the aerating chamber and the clarifying chamber.

U.S. Pat. No. 4,859,325, issued Aug. 22, 1989, to Murphy Cormier, describes a waste material treatment apparatus. The apparatus includes a tank having two serial chambers. The first chamber is an aerating chamber including a diffuser. The diffuser introduces oxygen into the aerating chamber which cooperates with baffles in the chamber to induce a predetermined circulation of the sewage. The clarifying chamber receives sewage from the aeration chamber via a passageway between the vertical wall separating the two chambers and the angled wall defining the clarification chamber. Sewage from the clarification chamber passes into the environment through a weir located near the sewage surface in the clarification chamber.

U.S. Pat. No. 5,162,083, issued Nov. 10, 1992, to Lee W. Forbes et al., describes an individual home waste water treatment plant conversion apparatus. The apparatus includes a circular tank with diffusers circumferentially dispersed about the lower periphery of the tank. A clarifier insert depends centrally from the ceiling of the tank. The clarifier insert has a horizontal cross-sectional profile that is generally oval in shape. The insert is vertically tapered from top to bottom and has a lower aperture located at a predetermined distance above the bottom of the tank. The clarifier insert defines an internal clarifier chamber surrounded by an aerator chamber. Sewage is introduced into the aerator chamber and circulated by the release of air by the diffuser members. Oxygenated sewage passes from the aerator chamber into the clarifier chamber through the lower aperture of the insert member. Particulate matter remaining in solution settles on the inner surface of the insert member and returns to the aerator chamber. Fluid is voided from the clarifier chamber through a weir located near the sewage surface at the top of the clarifier chamber.

None of the foregoing inventions are seen as teaching or suggesting the claimed sewage treatment method or apparatus therefor. None of the inventions uses cooperating walls of an aerator chamber to define interacting aerator zones that promote a sewage flow which enhances the oxygen content of the sewage. Also, none of the inventions associates oxygen at super-ambient pressure with sewage which enhances sewage oxygenation.

SUMMARY OF THE INVENTION

The invention provides an apparatus and method for inducing flow characteristics in, and maintaining air at super-ambient pressure in contact with, sewage to enhance sewage oxygenation. An apparatus constructed according to the invention includes a tank having a floor, side walls, and an upper aperture. One embodiment provides a cover, sealingly mounted over the tank aperture, to maintain a pocket of air above the sewage at a predetermined super-ambient pressure within the tank. A hopper is positioned centrally in the tank with hopper supports such that it extends downwardly from the aperture. The hopper has an internal clarifier chamber with an upper aperture and a lower aperture. A deflector cone sits on the floor of the tank beneath the lower aperture of the hopper. The cooperating surfaces of the exterior of the hopper and deflector cone and the inner walls and floor of the tank define an aerator chamber, subdivided into aerator zones.

An inlet introduces sewage into the aerator chamber. Diffusers in each aerator zone introduce oxygen-rich ambient air into, and induce flow of the sewage within, each aerator zone in a predetermined direction. Oxygenated sewage passes from the aerator zones through the lower aperture of the hopper into the clarifier chamber. Particulate matter remaining in solution in the clarifier chamber settles onto the interior walls of the clarifier chamber and drops back into the aerator chamber. Clarified sewage from the clarifier chamber passes into the environment through a conduit located in the center of the chamber near the sewage surface.

Another embodiment of the invention includes a trash trap and a settling tank disposed on either side of the treatment tank. This three-tank configuration provides a sewage treatment system consonant with many sewage treatment apparatus regulations throughout the world.

The method for sewage treatment in a sewage treatment tank includes subdividing an aerator chamber of the tank into distinct aerator zones. The method also includes introducing sewage into the aerator chamber and diffusing air into at least one aerator zone to induce flow of the sewage in a predetermined direction within that aerator zone. A deflector cone the may be used to promote sewage flow. Another embodiment of the method includes maintaining air at super-ambient pressure in association with the sewage contained in the tank. An alternative embodiment includes providing a trash trap which receives raw sewage, settles out over-sized matter and delivers the screened sewage into the inlet. Yet another embodiment includes providing a settling tank receiving sewage from the outlet, for settling out particulate matter.

The invention provides a waste treatment apparatus and method in which an aerator chamber is subdivided into a discrete number of aerator zones that enhance efficient oxygenation of sewage. The invention also provides an apparatus and method that maintains air at super-ambient pressure in contact with the sewage to increase oxygenation of the sewage. The invention converts raw sewage into high quality effluent that may be absorbed by the environment.

These and other features and advantages of this invention will become apparent to those skilled in the art from the following description, claims, and accompanying drawings.

BRIEF DESCRIPTION OF THE DRAWINGS

The invention is described in detail below with reference to the following drawings, throughout which similar reference characters designate corresponding features consistently, wherein.

DETAILED DESCRIPTION OF THE INVENTION

1. Sewage Treatment Apparatus

Figure 1:
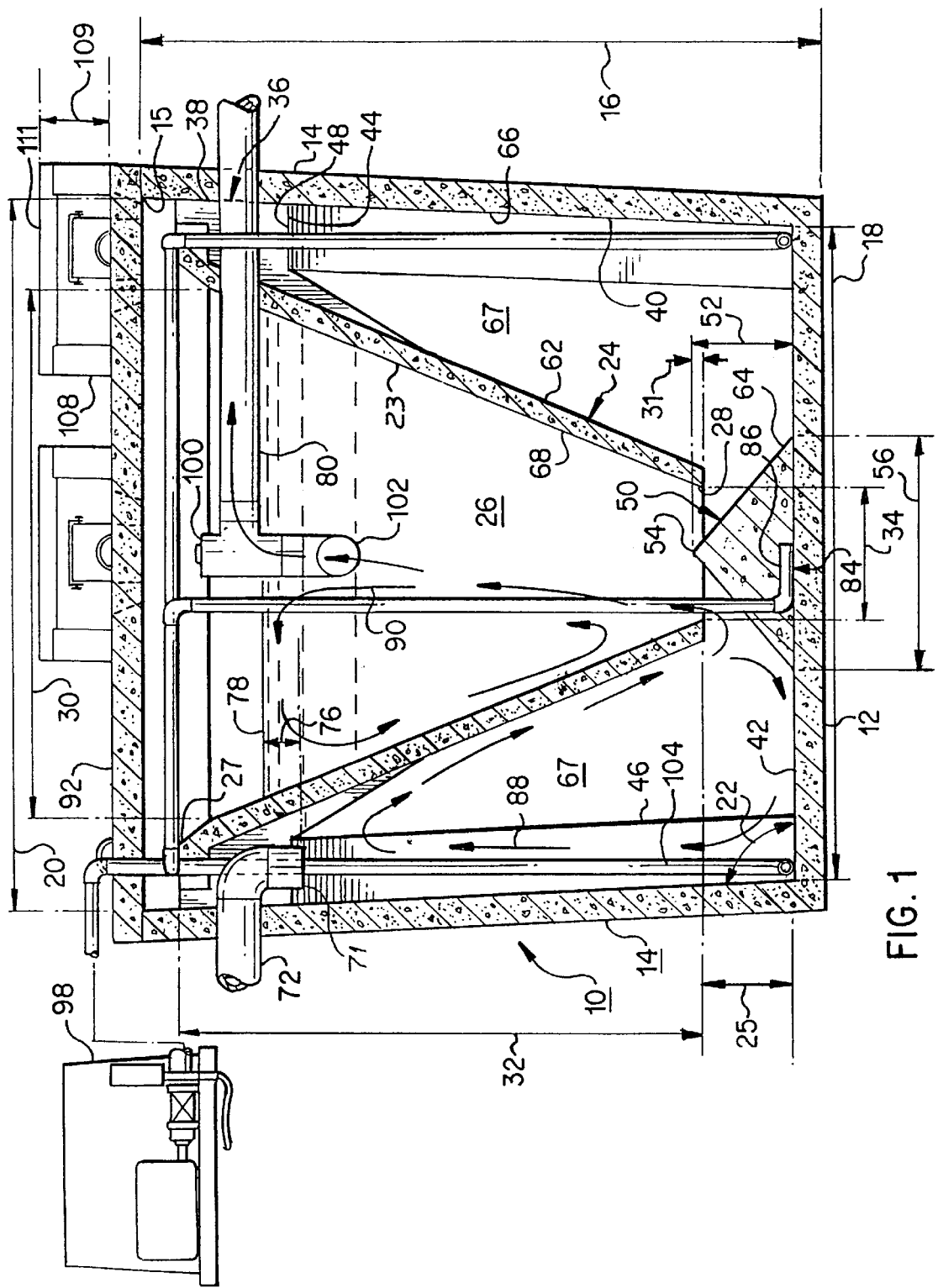
FIG. 1 is a vertical, cross-sectional detail view of an apparatus constructed according to principles of the invention, drawn along line 1—1 in FIG. 2.

Referring to FIG. 1, the invention includes a treatment tank 10 with a floor 12, walls 14 and an upper aperture 15. Preferably, the floor 12 and walls 14 are integrally molded from concrete having three-inch thickness.

A hopper 24 is received in the upper aperture 15 of the tank 10. The hopper has walls 23 with interior surfaces 68 and exterior surfaces 62. The upper portion 36 of the hopper 24 has peripheral faces 38 that mate with the inner surfaces 40 of the walls 14 of the tank 10. The peripheral faces 38 and walls 14 are configured such that the hopper 24 is maintained at a predetermined height 25 above the inner surface 42 of the floor 12 of the tank 10. The peripheral faces 38 include notches 106, as best seen on FIG. 2, to discourage air pockets from forming between the tank 10 and hopper 24.

In addition to the tank supporting and maintaining the position of the hopper 24 in the tank 10, or alternatively, the upper portion 36 of the hopper 24 includes mounting pads 44 that extend into each corner of the treatment tank 10. The mounting pads 44 of the hopper 24 seat on mounting pads 48 of hopper supports 46, discussed infra, or other structures (not shown) which may be introduced in or incorporated into the tank 10.

The lower portion of the hopper 24 has a like number of exterior surfaces 62 as interior surfaces 40 that cooperate with the interior surface 42 of the floor 12 of the tank 10 to promote flow in each aerator zone. Preferably, flow occurs generally vertically, rather than horizontally around the tank 10.

The hopper 24 has an interior clarifier chamber 26 with an upper aperture 27 and a lower aperture 28. The narrow, throat-like lower aperture 28 minimizes fluid flow within the clarifier chamber 26, thus encouraging the settling out of particulate matter onto and down the interior surfaces 68 of the clarifier chamber 26 and out of the lower aperture 28.

Figure 2:
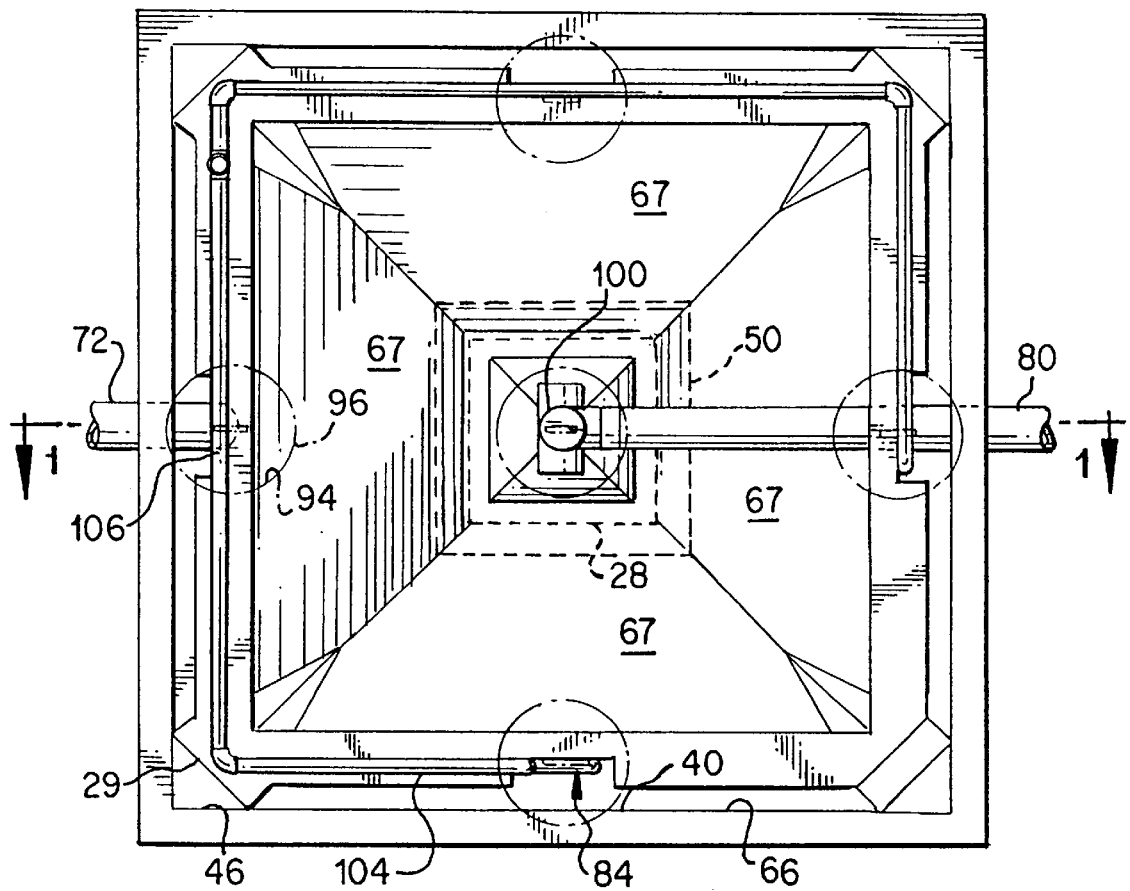
FIG. 2 is a top plan view of an apparatus constructed according to principles of the invention showing the cover thereof in ghost lines.

Hopper supports 46, mentioned above, are disposed in each corner of the treatment tank 10. Each hopper support 46, as best seen in FIG. 2, preferably, has a cross-sectional profile having an isosceles-triangle shape with a base 29. Each base 29 is disposed inwardly toward the center of the tank 10. The hopper supports 46 may be primarily responsible for maintaining the hopper 24 such that the aperture 28 is properly situated at the predetermined height 25 above the floor 12 of the tank 10.

A deflector cone 50 is mounted on the floor 12 of the tank 10, beneath the aperture 28 of the hopper 24. The deflector cone 50 should be centrally located on the floor 12 of the tank 10 to encourage uniform flow characteristics throughout the tank 10. Preferably, the deflector cone has a like number of surfaces 64 as tank interior surfaces 40 and hopper exterior surfaces 62. The surfaces 40, 62 and 64 cooperate with the floor interior surface 42 to promote flow within each aerator zone 67, described below, rather than flow around the tank 10. To restrict flow in and out of the aperture 28 of the hopper 24, the vertex 54 of the deflector cone 50 is received into the center of the lower aperture 28 of the hopper 24 by a predetermined amount 31.

Referring also to FIG. 2, for the sake of discussion only, the tank interior surfaces 40, hopper exterior surfaces 62 deflector cone exterior surfaces 64 and floor 12 define an annular aerator chamber 66 subdivided into four aerator zones 67. The number of aerator zones 67 need not equal four necessarily. However, experimentation has shown that the use of four aerator zones 67 provides optimal sewage oxygenation in the tank 10. Oxygenation tends to occur more rapidly and efficiently in smaller volumes of sewage. Additionally, the use of four aeration zones 67 has been found to discourage activated sludge accumulations on the floor 12 and minimize the total suspended solids discharged into the environment.

Referring to FIG. 1, each aerator zone 67 may assume any shape in vertical cross section that achieves optimal flow characteristics, such as the right triangle shape shown. The surfaces that define each aerator zone 67 may assume any orientation toward that end. Preferably, the surfaces should be parallel to a common line. Assuming this configuration, the surfaces will deflect flow within a generally vertical pattern within each aerator zone.

Confining flow within an aerator zone essentially reduces the working volume of sewage being processed, thus enhances oxygenation of the sewage. Also, when a volume of fluid assumes a unique flow pattern relative to another, a boundary layer or quasi surface exists between the two volumes. The invention provides for establishing unique flow patterns in each aerator zone relative to the other aerator zones. Accordingly, a boundary layer or quasi surface exists between the volumes of sewage in each aerator zone. Interaction between the volumes of sewage in each aerator zone occurs along the quasi surfaces created which promotes oxygenation. The interaction, possibly turbulent, also further agitates the sewage and helps to prevent the solids from settling. This agitation feature reduces the amount of servicing that devices not utilizing the principles of the invention require to clean out settled matter.

Referring again to FIG. 1, an example of the preferred embodiment of the invention includes a tank 10 having an overall exterior height 16 that is approximately 66 inches, a lower interior width 18 of approximately 64.5 inches, and an upper interior width 20 of approximately 70.5 inches. An exemplary hopper 24 has an overall height 32 that is approximately 51 inches, an upper aperture interior width 30 of approximately 56 inches and a lower aperture interior width 34 of approximately 13 inches. The ideal example of a hopper support 46 stands approximately 52 inches tall and a cross-sectional base 29 measuring approximately seven inches. The exemplary height 25 of the lower aperture 28 of the hopper 24 above the interior surface 42 of the floor 12 is approximately nine inches. The preferred example of a deflector cone 50 has an overall height 52 of approximately ten inches and a width 56 of approximately 23 inches. The preferred example of the amount 31 that the vertex 54 extends into the aperture 28 of the hopper 24 is approximately one inch. This preferred configuration accommodates treatment of 500–1500 gallons of sewage per day, depending on the amount of air introduced into the tank 10.

Diffusers 84 are disposed in each aerator zone 67. The diffusers 84 each include foraminous members 86 proximate to the interior surface of the floor 12 and the interior surface 40 of the walls 14 of the treatment tank 10. The foraminous members 86 receive pressurized air and create large quantities of air bubbles (not shown). The air bubbles flow upward and induce the sewage in the treatment tank 10 to circulate in a first direction 88. The sewage circulates up the wall 14 of the tank and then the down the exterior surface 62 of the hopper 24. Some of the sewage flows against the deflector cone 50 and up through the aperture 28 of the hopper 24. The bulk of the sewage is deflected by the deflector cone 50 and encouraged to continue to circulate in the first direction 88.

Once in the clarifier chamber 26, the fluid circulates slowly in a second direction 90. While circulating in the clarifier chamber 26, particulate matter precipitates from solution and falls against the interior surface 68 of the hopper 24. The particulate matter slides down the interior surface 68, through the aperture 28, and back into one of the aerator zones 67. Once back in an aerator zone 67, the particulate matter re-circulates in the first direction 88 for further breakdown by bacterial agents in the aerator zones 67.

Referring also to FIG. 2, a cover 92 is configured to seat on and seal the aperture 15 of the treatment tank 10. When the cover 92 is in place, the apparatus is installable as a self-contained unit in the ground nearby the building the apparatus is servicing. The cover 92 prevents the apparatus from becoming clogged with dirt and maintains a pocket of air above the sewage at a predetermined super-ambient pressure within the tank. The cover 92 has an access hole 94 over each diffuser 84 for periodic servicing. An access cap 96 is received sealingly in each access hole 94. The access hole 94 and access cap 96 threadingly interengage. The cover 92 and access cap 96 discourage gas from escaping from the treatment tank 10.

The cover 92 includes conventional risers 108 disposed over each access hole 94. Each riser 108 permits service access to the access holes 94 without having to unearth the entire cover 92 to do so. Each riser 108 has a height 109 above the cover 92 suitable to permit servicing the apparatus, while at the same time, rendering the apparatus virtually unnoticeable. The riser 108 includes a cap 111 that, when the apparatus is installed, is substantially flush with the ground. The cap 111 is mounted on the riser 108 in a known fashion.

An inlet 72 extends through a wall 14 of the tank 10 and introduces sewage into the aerator chamber 66. The inlet 72 has an aperture 71 that is bent downwardly, terminating below the sewage level 78 in the treatment tank 10. If the aperture 71 were not provided in such a manner, gas pressure within the pocket defined by the cover 92, walls 14 and sewage surface would be in equilibrium with the ambient atmosphere as noxious gases vented back into the building the apparatus services. In other words, foul smelling gases would return from the treatment tank into the building and create inhospitable conditions.

An outlet 80 is centrally disposed in the upper portion 36 of the hopper 24 which voids sewage from the clarifier chamber 26. Since the inlet 72 initiates sewage treatment and the outlet 80 terminates treatment, relative placement of the two conduits controls apparatus performance, specifically the vertical relationship 76 between the inlet 72 and outlet 80. One of the main advances of the invention is associating air at super-ambient pressure with the sewage in the tank 10. Maintaining a pocket of air at super-ambient pressure in association with the sewage forces more air, hence oxygen, into the sewage, enhancing the oxygenation of the sewage. Sewage containing great amounts of oxygen can sustain larger bacteria populations that more swiftly break down organic components in the sewage. In order to pressurize the air pocket above the sewage surface, the inlet 72 must be maintained above the outlet 80 by a predetermined vertical relationship 76. Sewage delivered by the inlet 72 at a superior height relative to the outlet 80 imparts pressure against sewage in the tank 10 proportional to this vertical relationship 76, as taught by Bernoulli's law. A large vertical relationship 76 results in greater pressure being exerted by the sewage column against the sewage in the tank 10. This pressure urges the sewage level 78 in the tank 10 to rise, thereby compressing gas against the pocket maintained by the cover 92. The sewage line 78 levels out at the height at which the outlet 80 is disposed, therefore may only compress the gas in the pocket by a predetermined amount.

The preferred vertical relationship 76 between the inlet 72 and the outlet 80 is approximately two inches. This two-inch drop creates a pocket of air having a pressure between 0.20 and 0.25 pounds per square inch (psi). Significant experimentation has shown that pressures exceeding this pressure range impair the treatment capability of the apparatus. First, the sewage in the treatment tank 10 does not flow as well as at lower pressures. Second, the air pump 98, discussed infra, that delivers air to the diffusers 84 tends to labor unproductively. Third, despite increased pressures, the diffusers 84 are not able to generate significantly more bubbles to increase the flow of the fluid.

In order to sustain the pocket of air at the ideal pressure, the diffusers 84 each receive ambient air at 2.5–3.0 psi which is introduced into the aerator zones 67 at a rate of 2.5–3.0 cubic feet per minute. The air not absorbed by the sewage, bubbles out of the sewage and is trapped in the pocket thereabove.

Ordinarily, sewage passes from the clarifier chamber 26 through the lower aperture 102 of the outlet 80. The sewage is oxygenated such that as the sewage passes out through the outlet 80, absorbed air escapes at a steady rate, maintaining the desired 0.20–0.25 psi air pocket. In the event the diffusers 84 introduce more than the desired amount of air into the aerator zone 67, or the inlet 72 or outlet 80 do not convey the sewage as intended, the apparatus may include a relief valve 100 mounted on the outlet 80. The relief valve 100 opens and vents to the atmosphere gasses at pressures exceeding 0.20–0.25 psi through the outlet 80.

Preferably, the air pump 98 is selected from models manufactured by Troy Air Blower, specifically Models H-500, H-1000, or H-1500. The air pump 98 supplies air to the diffuser 52 through conventional fluid conduit 104. As best seen in FIG. 2, the hopper 24 has notches 106 that accommodate the conduit 104. The notches 106 also provide access to the diffusers 84 for periodic servicing as required.

Figure 3:
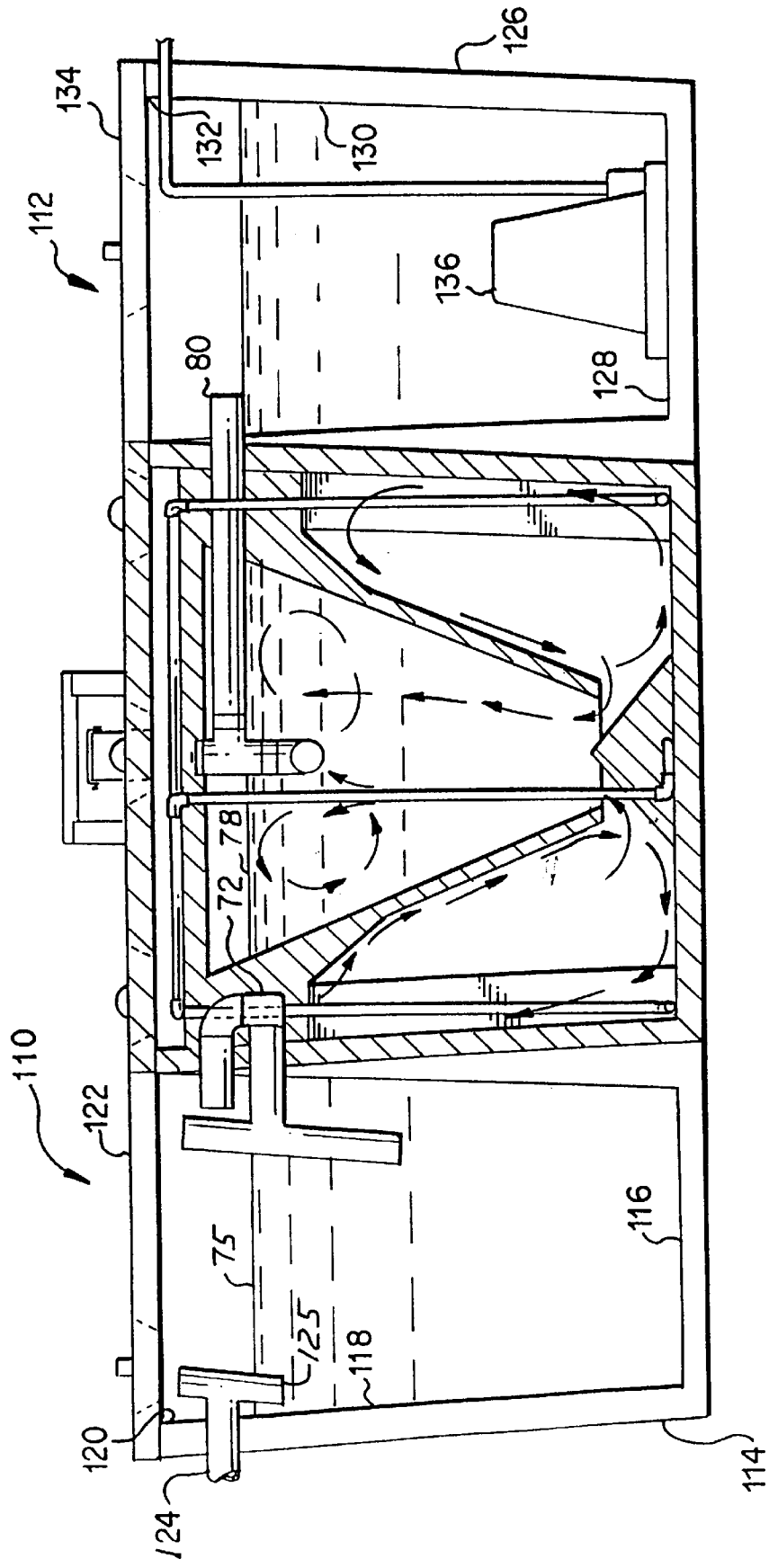
FIG. 3 is a vertical, cross-sectional detail view of other embodiments of an apparatus constructed according to principles of the invention, including a trash trap and a settling tank disposed on either side of the treatment tank.

Referring to FIG. 3, another embodiment of the invention is shown. In addition to a treatment tank 10 as described above, the embodiment also includes a conventional trash trap 110. The trash trap 110 includes a conventional tank 114 with a floor 116, walls 118, an upper aperture 120, and a cover 122. Sewage is introduced into the tank 114 through conventional conduit 124. Once inside the tank 114, inorganic materials, such as rags, settle out. The settled sewage then passes into the inlet 72. Unlike in the original embodiment, the inlet 72 need not have a downwardly-oriented aperture. The sewage line 75 in the trash trap 110 is substantially equal to the sewage line 78 in the treatment tank 10. The height at which the trash trap sewage line 75 is maintained determines the height of the sewage line 78 in the treatment tank 10. So long as the inlet 72 is maintained below the sewage line 75, its configuration does not affect the sewage line 78 in the treatment tank 10 or air pocket pressure. The sewage level 75 in the trash trap 110 depends on the location of the inlet 124. More specifically, the aperture 125 of the inlet 124 must be configured to define the 2-inch drop between it and the outlet 80, as described above.

Once the sewage has been processed in the treatment tank, as described above, the sewage passes into the settling tank 112 via the outlet 80. The settling tank 112 also includes a conventional tank 126 with a floor 128, walls 130, an upper aperture 132, and a cover 134. Sewage introduced into the settling tank 112 is held for a predetermined time, allowing for particulate matter to settle out, prior to introducing the effluent into the environment. A pump 136 is provided for removing the sewage from the settling tank 112.

2. Sewage Treatment Method

The preferred apparatus for carrying out the method is described in detail above. In the interest of brevity and simplicity, the following description of the method highlights only the major features thereof.

The method is intended for sewage treatment in a treatment tank. The method includes providing a hopper in the treatment tank having an interior clarifier chamber. The exterior surfaces of the hopper and like number of interior surfaces of the tank walls along with the tank floor define an aerator chamber, subdivided into a like number of aerator zones. Cooperating sets of tank and hopper surfaces maintain sewage flow within each aerator zone. Preferably, the sewage flow is generally vertical, rather than horizontal. Although the precise number of aerator zones is not crucial, experimentation has shown that four aerator zones facilitate optimal efficient oxygenation of sewage within the tank.

The method also includes introducing sewage and air into the tank. The air is diffused into the sewage in a manner that induces flow of the sewage in a predetermined substantially vertical direction. Inducing the preferred vertical flow is effectuated by disposing the diffusers at the periphery of the aerator zones. Bubbles of air disbursed by the diffusers urge the sewage to flow up along the interior surfaces of the tank walls, then turn and flow down along the exterior surface of the hopper toward the floor of the tank.

The method further includes providing a deflector cone in the tank, further defining the aerator zones. A deflector cone promotes flow within each aerator zone as well as between the aerator zones and the clarifier chamber.

The method additionally includes maintaining air at super-ambient pressure in association with the sewage contained in the tank. Maintenance of air at super-ambient pressure increases the rate at which the sewage absorbs oxygen. Increased oxygen absorption intensifies bacterial growth and facilitates swifter breakdown of the organic components of the sewage.

The method yet also includes voiding sewage from the tank into the environment. Consistent with maintaining air at super-ambient pressure in contact with the sewage, the preferred outlet is vertically inferior to the inlet. Sewage delivered by the inlet at a superior height relative to the outlet imparts pressure against sewage in the tank proportional to the height. This pressure urges the sewage level in the tank to rise, thereby compressing gas into the pocket maintained by the cover. The sewage line levels out at the height at which the outlet is disposed, therefore may only compress the gas in the pocket by a predetermined amount.

Another embodiment of the method includes providing a trash trap in fluid communication with the inlet prior to conveying sewage into the treatment tank. The trash trap settles out inorganic matter from the sewage prior to its delivery into the treatment tank. This preliminary filtration discourages clogging and reduces the amount of maintenance that otherwise might be necessary for appropriate sewage treatment.

An additional embodiment of the method includes providing a settling tank in fluid communication with the treatment tank. A settling tank allows particulate matter not broken down in the treatment tank to precipitate from the sewage solution prior to its discharge into the environment.

The invention is not limited to the embodiments described above, but includes all modifications and improvements falling within the scope of the following claims.

I claim:

1. A sewage treatment apparatus comprising:
    a tank having inner wall surfaces and a floor having a floor surface;
    a hopper, mounted on said tank, having outer wall surfaces and a clarifier chamber;
    said inner wall surfaces and said outer wall surfaces defining an aerator chamber;
    said inner surfaces cooperating with said outer surfaces to define a plurality of aerator zones in said aerator chamber, an inlet for introducing sewage into at least one of said aerator zones; and an outlet for removing sewage from said clarifier chamber, wherein each of said aerator zones is configured to promote a flow for enhancing oxygenation of the sewage.

2. The apparatus of claim 1, further comprising a diffuser for introducing gas into at least one of said aerator zones.

3. The apparatus of claim 1, wherein said flow is substantially vertical.

4. The apparatus of claim 1, said clarifier being configured to promote a second flow toward said outlet.

5. The apparatus of claim 1, further comprising a deflector cone having outer surfaces further defining said aerator chamber, one of said outer surfaces further defining one of said aerator zones.

6. The apparatus of claim 1, further comprising:
    a cover mounted on said tank;
    said tank and said cover being configured to maintain a gas pocket in association with sewage received in the tank.

7. The apparatus of claim 6, wherein said gas pocket has a super-ambient pressure.

8. The apparatus of claim 6, wherein said gas pocket has a pressure including and ranging between 0.20–0.25 psi.

* * * * *